US009161217B2

(12) United States Patent
Lee et al.

(10) Patent No.: US 9,161,217 B2
(45) Date of Patent: Oct. 13, 2015

(54) METHOD AND SYSTEM FOR AUTHENTICATING IN A COMMUNICATION SYSTEM

(75) Inventors: Ji-Cheol Lee, Suwon-si (KR); Alper Yegin, Istanbul (TR)

(73) Assignee: Samsung Electronics Co., Ltd., Suwon-si (KR)

(*) Notice: Subject to any disclaimer, the term of this patent is extended or adjusted under 35 U.S.C. 154(b) by 645 days.

(21) Appl. No.: 12/720,972

(22) Filed: Mar. 10, 2010

(65) Prior Publication Data

US 2010/0232606 A1    Sep. 16, 2010

(30) Foreign Application Priority Data

Mar. 10, 2009    (KR) .................. 10-2009-0020318

(51) Int. Cl.
| | |
|---|---|
| *H04W 12/04* | (2009.01) |
| *H04W 12/06* | (2009.01) |
| *H04L 29/06* | (2006.01) |
| *H04W 84/12* | (2009.01) |
| *H04W 88/08* | (2009.01) |

(52) U.S. Cl.
CPC ............ *H04W 12/06* (2013.01); *H04L 63/08* (2013.01); *H04L 63/0892* (2013.01); *H04L 63/162* (2013.01); *H04W 12/04* (2013.01); *H04W 84/12* (2013.01); *H04W 88/08* (2013.01)

(58) Field of Classification Search
CPC ... H04L 63/08; H04L 63/0892; H04L 63/162; H04W 12/06; H04W 12/04; H04W 84/12; H04W 88/08
USPC ........................................................ 713/168
See application file for complete search history.

(56) References Cited

U.S. PATENT DOCUMENTS

| | | | | |
|---|---|---|---|---|
| 6,151,676 A | * | 11/2000 | Cuccia et al. ............... | 713/176 |
| 2002/0012433 A1 | * | 1/2002 | Haverinen et al. ........... | 380/247 |
| 2002/0164026 A1 | * | 11/2002 | Huima .......................... | 380/247 |

(Continued)

FOREIGN PATENT DOCUMENTS

| | | |
|---|---|---|
| CN | 1628449 A | 6/2005 |
| EP | 1 322 091 A1 | 6/2003 |

(Continued)

OTHER PUBLICATIONS

Zaghloul et al., On the Performance of the AAA Systems in 3G Cellular Networks, Jun. 2007, IEEE International Conference on Communications, pp. 2103-2108.*

(Continued)

*Primary Examiner* — Kenneth Chang
(74) *Attorney, Agent, or Firm* — Jefferson IP Law, LLP (57) ABSTRACT

A method and system for authenticating in a communication system are provided. The method includes, in a first authenticator, sending an authenticator relocation request to a second authenticator transmitting a hash value for an authentication parameter of a Mobile Terminal (MT), a random parameter 1, and a random parameter 2 from the second authenticator to the first authenticator; in the first authenticator, transmitting the hash value received from the second authenticator and the random parameter 1 to an Authentication, Authorization, and Accounting (AAA) server; in the AAA server, determining a validity of the hash value received from the first authenticator, and in the AAA server, transmitting the authentication parameter ever used at the time of authenticating the MT, to the first authenticator.

23 Claims, 5 Drawing Sheets

(56) References Cited

U.S. PATENT DOCUMENTS

| | | | |
|---|---|---|---|
| 2003/0028763 A1* | 2/2003 | Malinen et al. | 713/155 |
| 2003/0056092 A1* | 3/2003 | Edgett et al. | 713/153 |
| 2004/0165551 A1* | 8/2004 | Krishnamurthi et al. | 370/328 |
| 2005/0044365 A1* | 2/2005 | Haukka et al. | 713/171 |
| 2005/0117524 A1 | 6/2005 | Lee et al. | |
| 2005/0166043 A1* | 7/2005 | Zhang et al. | 713/155 |
| 2005/0251681 A1* | 11/2005 | Robles et al. | 713/172 |
| 2006/0002356 A1* | 1/2006 | Barany et al. | 370/338 |
| 2006/0088011 A1* | 4/2006 | Iyer et al. | 370/338 |
| 2006/0171540 A1* | 8/2006 | Lee et al. | 380/277 |
| 2006/0185013 A1* | 8/2006 | Oyama et al. | 726/21 |
| 2006/0233376 A1 | 10/2006 | Forsberg et al. | |
| 2006/0280305 A1* | 12/2006 | Bajko et al. | 380/270 |
| 2007/0060127 A1 | 3/2007 | Forsberg | |
| 2007/0091843 A1* | 4/2007 | Patel et al. | 370/331 |
| 2007/0118885 A1 | 5/2007 | Elrod | |
| 2007/0250706 A1* | 10/2007 | Oba | 713/159 |
| 2008/0137853 A1* | 6/2008 | Mizikovsky et al. | 380/247 |

FOREIGN PATENT DOCUMENTS

| | | |
|---|---|---|
| EP | 1 414 262 A1 | 4/2004 |
| JP | 2007-74238 A | 3/2007 |
| JP | 2008-536428 A | 9/2008 |
| KR | 10-2004-0009177 A | 1/2004 |
| KR | 10-2004-0056994 A | 7/2004 |
| KR | 10-2008-0050971 A | 6/2008 |
| WO | 01/24560 A1 | 4/2001 |
| WO | 01/39538 A1 | 5/2001 |
| WO | 2006/021236 A1 | 3/2006 |
| WO | 2006/124030 A1 | 11/2006 |
| WO | 2008/074366 A1 | 6/2008 |

OTHER PUBLICATIONS

IEEE P802.11F/D5, Draft Recommended Practice for Multi-Vendor Access Point Interoperability via an Inter-Access Point Protocol Across Distribution Systems Supporting IEEE 802.11 Operation, Jan. 1, 2003, pp. 1-83.

3rd Generation Partnership Project; Technical Specification Group Services and System Aspects; General Packet Radio Service (GPRS) enhancements for Evolved Universal Terrestrial Radio Access Network (E-Tran) access (Release 8), 3GPP TS 23.401, 3rd Generation Partnership Project (3GPP), Dec. 2008, Sophia Antipolis Valbonne, France.

* cited by examiner

METHOD AND SYSTEM FOR AUTHENTICATING IN A COMMUNICATION SYSTEM

PRIORITY

This application claims the benefit under 35 U.S.C. §119(a) of a Korean patent application filed in the Korean Intellectual Property Office on Mar. 10, 2009 and assigned Serial No. 10-2009-0020318, the entire disclosure of which are herein incorporated by reference.

BACKGROUND OF THE INVENTION

1. Field of the Invention

Aspects of the present invention relate to a method and system for authenticating a Mobile Terminal (MT) in a communication system. More particularly, aspects of the present invention relate to a method and system for relocating an authenticator of an MT without performing a procedure of re-authentication of the MT in a communication system.

2. Description of the Related Art

In a communication system, a service provider carries out a user authentication procedure to determine subscription or non-subscription for users who intend to use a network service and service provision or non-provision. For example, when using Extensible Authentication Protocol (EAP), an MT and an Authentication, Authorization, and Accounting (AAA) server perform an authentication procedure through a serving network of the MT. The authentication procedure is described below with reference to FIG. 1. The EAP represents a protocol for encapsulating and information to facilitate authentication, such as Message Digest number 5 (MD5), Transport Layer Security (TLS), Secure Remote Password (SRP), and the like.

Figure 1:
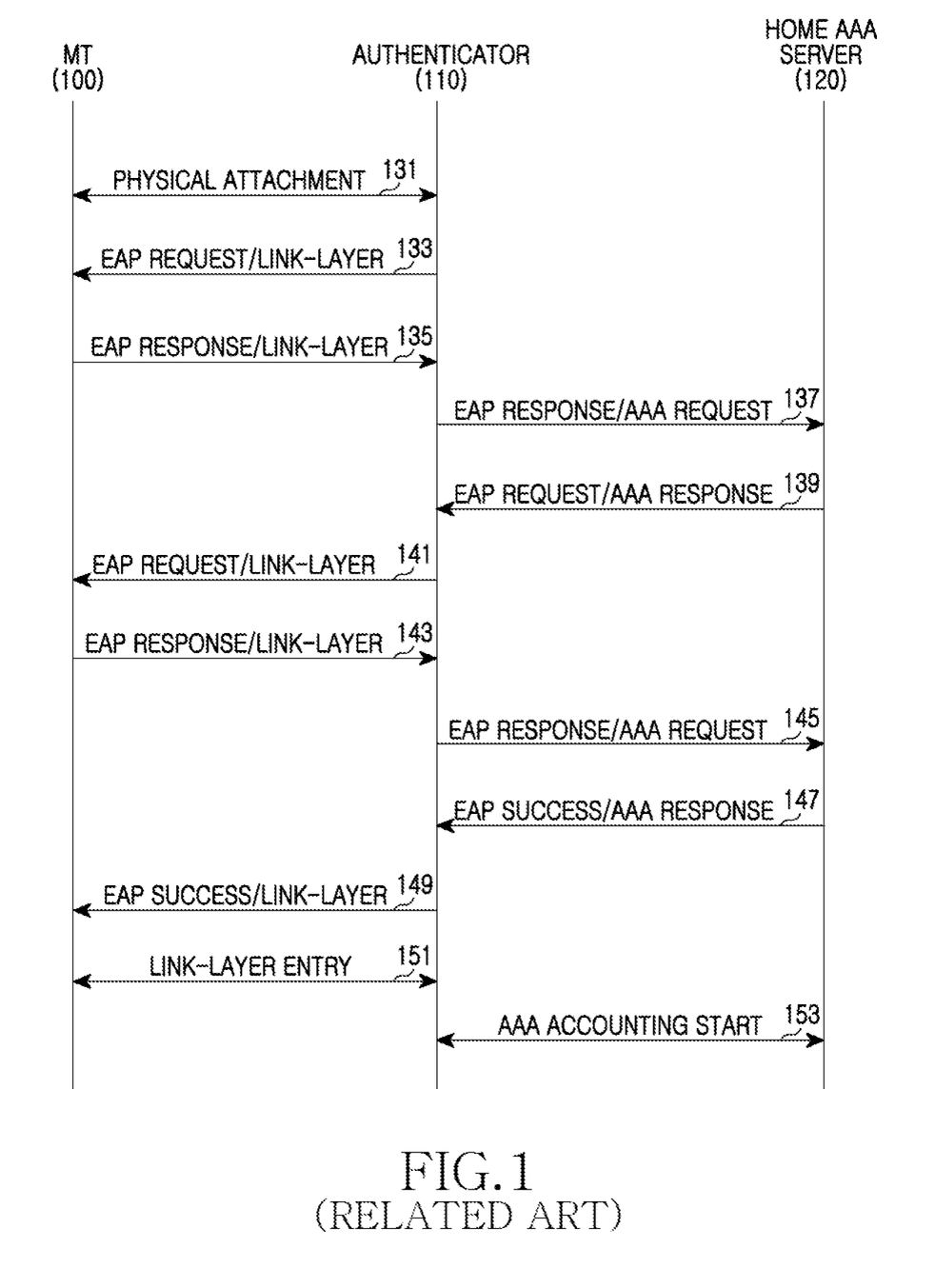
FIG. 1 is a ladder diagram illustrating a procedure of authenticating a Mobile Terminal (MT) in a wireless communication system according to the related art.

FIG. 1 illustrates a procedure of authenticating an MT in a wireless communication system according to the related art.

Referring to FIG. 1, in step 131, the MT 100 completes a physical layer attachment with an authenticator 110. The MT 100 and the authenticator 110 then initiate a procedure of link-layer entry of the MT 100. In step 133, the authenticator 110 sends the MT 100 an EAP request message (EAP Request/Link-layer) requesting IDentification (ID) information for authentication of the MT 100. At this time, the MT 100 and the authenticator 110 exchange a signal through a Base Station (BS) that is located between the MT 100 and the authenticator 110. The EAP request message is defined here as 'PKMv2 PKM-REQ/EAP-Transfer' in the Institute of Electrical and Electronics Engineers (IEEE) 802.16 standard.

In step 135, the MT 100 sends the authenticator 110 an EAP response message (EAP Response/Link-layer) including its own ID information in response to the EAP request message (EAP Request/Link-layer). The EAP response message is defined here as 'PKM-RSP/EAP-Transfer' in the IEEE 802.16 standard.

In step 137, the authenticator 110 includes the ID information of the MT 100 included in the EAP response message (EAP Response/Link-layer), in an AAA request message (EAP Response/AAA Request), and sends the AAA request message (EAP Response/AAA Request) to a home AAA server 120.

The AAA server 120 determines an EAP authentication method using the ID information of the MT 100 identified through the AAA request message (EAP Response/AAA Request). In steps 139 and 141, the AAA server 120 transmits the determined EAP authentication method information to the MT 100 through the authenticator 110.

Through an EAP request message (EAP Request/Link-layer) received from the authenticator 110, the MT 100 identifies the EAP authentication method determined by the AAA server 120. In steps 143 and 145, the MT 100 transmits information of the MT 100 necessary for the EAP authentication method to the AAA server 120 through the authenticator 110. In steps 139 to 145, the AAA server 120, the authenticator 110, and the MT 100 repeatedly transmit/receive the EAP authentication method information and the information of the MT 100 necessary for the EAP authentication method, in preparation for packet loss.

The AAA server 120 determines whether to authenticate the MT 100 using the information of the MT 100 necessary for the EAP authentication method included in an AAA request message (EAP Response/AAA Request) received from the authenticator 110. If the AAA server 120 is able to authenticate the MT 100, then in steps 147 and 149, the AAA server 120 sends an authentication success message to the MT 100 through the authenticator 110.

In step 151, the MT 100 completes the link-layer entry with the authenticator 110. If so, then in step 153, the AAA server 120 starts accounting for the authenticator 110. Upon being authenticated from an AAA server and succeeding in a link-layer entry through the above authentication procedure, an MT is provided with a network service.

However, the above authentication procedure can have a problem that a delay caused by transmission/reception of a message between an authenticator and an AAA server results in a failure of a network entry of the MT. For instance, when the MT authenticated from the AAA server moves to a service area of a different network or the authenticator is relocated, the MT should again perform the authentication procedure of FIG. 1. However, there can be a problem that a delay caused by transmission/reception of a message between the authenticator and the AAA server results in a failure of a network entry of the MT.

SUMMARY OF THE INVENTION

An aspect of the present invention is to address at least the above-mentioned problems and/or disadvantages and to provide at least the advantages described below. Accordingly, an aspect of the present invention is to provide a method and system for reducing a time delay caused by authentication of a Mobile Terminal (MT) in a communication system.

Another aspect of the present invention is to provide a method and system for reducing a time delay caused by authentication of an MT when an authenticator of the MT is relocated in a communication system.

A further aspect of the present invention is to provide a method and system for authenticating an MT using an authentication parameter that a different authenticator has previously used for authenticating the MT, in an authenticator of a communication system.

The above aspects are addressed by providing a method and system for authenticating in a communication system.

In accordance with an aspect of the present invention, a method for authenticating a Mobile Terminal (MT) in a communication system is provided. The method includes, in a first authenticator, sending an authenticator relocation request to a second authenticator for a link-layer entry of an MT that accesses a physical layer, when the second authenticator includes an authentication parameter of the MT, transmitting a hash value for the authentication parameter of the MT, a random parameter 1, and a random parameter 2 from the second authenticator to the first authenticator according to the authenticator relocation request of the first authenticator, in the first authenticator, transmitting the hash value for the authentication parameter of the MT received from the second authenticator and the random parameter 1 to an Authentication, Authorization, and Accounting (AAA) server, in the AAA server, determining a validity of the hash value for the authentication parameter of the MT received from the first authenticator, and, when the AAA server determines that the hash value for the authentication parameter of the MT is valid transmitting an authentication parameter previously used at the time of authenticating the MT, from the AAA server to the first authenticator. The random parameter 1 represents a parameter for authentication of the first authenticator and the AAA server. The random parameter 2 represents a parameter for authentication of the first authenticator and the second authenticator.

In accordance with another aspect of the present invention, a communication system for authenticating a Mobile Terminal (MT) is provided. The system includes a first authenticator, a second authenticator, and an Authentication, Authorization, and Accounting (AAA) server. The first authenticator sends an authenticator relocation request to a second authenticator for a link-layer entry of an MT that accesses a physical layer, and transmits a hash value for an authentication parameter of the MT received from the second authenticator and a random parameter 1 to an Authentication, Authorization, and Accounting (AAA) server. The second authenticator includes an authentication parameter of the MT, and transmits the hash value for the authentication parameter of the MT, the random parameter 1, and a random parameter 2 to the first authenticator according to the authenticator relocation request of the first authenticator. When the hash value for the authentication parameter of the MT received from the first authenticator is determined to be valid, the AAA server transmits an authentication parameter previously used at the time of authenticating the MT, to the first authenticator. The random parameter 1 represents a parameter for authentication of the first authenticator and the AAA server.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following description is made for a technology for reducing a delay caused by Extensible Authentication Protocol (EAP) authentication when an authenticator of a Mobile Terminal (MT) is relocated in a communication system according to an exemplary embodiment of the present invention.

In the following description, upon receiving a link-layer entry request from an MT, an authenticator performs a procedure of data link entry with the MT using an authentication parameter that a different authenticator has previously used for authenticating the MT. Here, it is assumed that the different authenticator uses the authentication parameter of the MT. The authentication parameter includes a Master Session Key (MSK) and a lifetime of the MSK.

In the following description, a Previous Authenticator (PA) denotes the different authenticator continuing to use the authentication parameter that the different authenticator has previously used for authenticating the MT. Thus, the MT and an Authentication, Authorization, and Accounting (AAA) server have performed an authentication procedure by way of the PA during a previous time. The PA includes the authentication parameter of the MT.

A wireless communication system is constructed as described below with reference to FIG. 2 in the case of performing authentication between an AAA server and authenticator and an MT.

Figure 2:
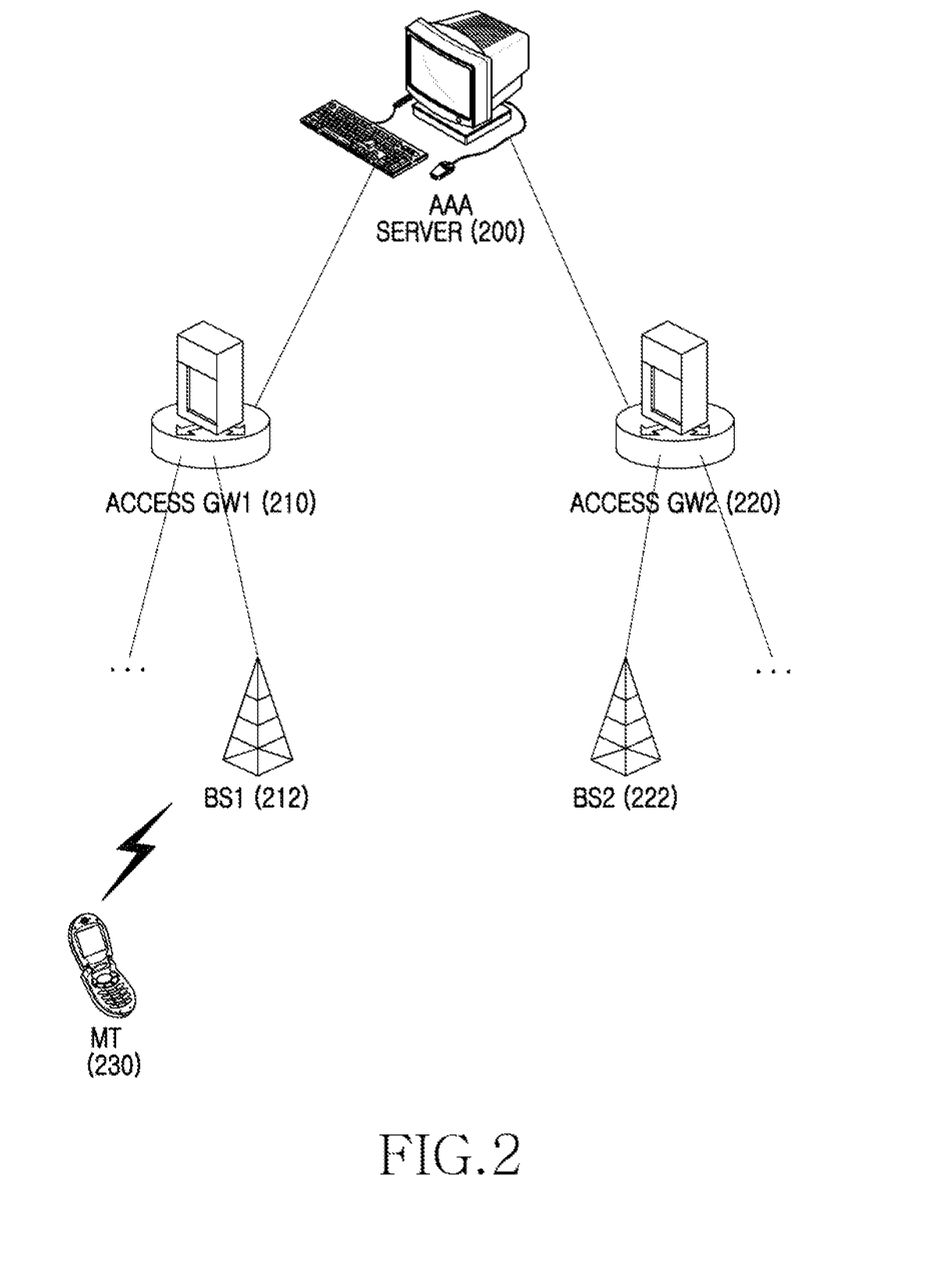
FIG. 2 is a diagram illustrating a construction of a wireless communication system according to an exemplary embodiment of the present invention.

FIG. 2 illustrates a construction of a wireless communication system according to an exemplary embodiment of the present invention.

Referring to FIG. 2, the wireless communication system includes an AAA server 200, access GateWays (GWs) 210 and 220, Base Stations (BSs) 212 and 222, and an MT 230. Although not shown in FIG. 2, the access GWs 210 and 220 may each include authenticators.

When the MT 230 accesses the BS1 212, the MT 230 performs an authentication procedure with the AAA server 200 through the access GW1 210. The MT 230 and the AAA server 200 perform the authentication procedure through an authenticator 1 that is included in the access GW1 210. For example, when the MT 230 performs an initial access, the MT 230 and the AAA server 200 can perform EAP authentication through the authenticator 1 as illustrated in FIG. 1 above.

When the MT 230 authenticated from the AAA server 200 moves to a service area of the BS2 222, an access GW providing a service to the MT 230 changes from the access GW1 210 to the access GW2 220. Thus, an authenticator 2 included in the access GW2 220 performs an authentication procedure for the MT 230 using an authentication parameter of the MT 230 acquired from the authenticator 1. For example, the authenticator 2 performs an authentication procedure for the MT 230 as described below with reference to FIG. 3. The authenticator 2 performs the authentication procedure for the MT 230 using a hash value for the authentication parameter of the MT 230 received from the authenticator 1.

Figure 3:
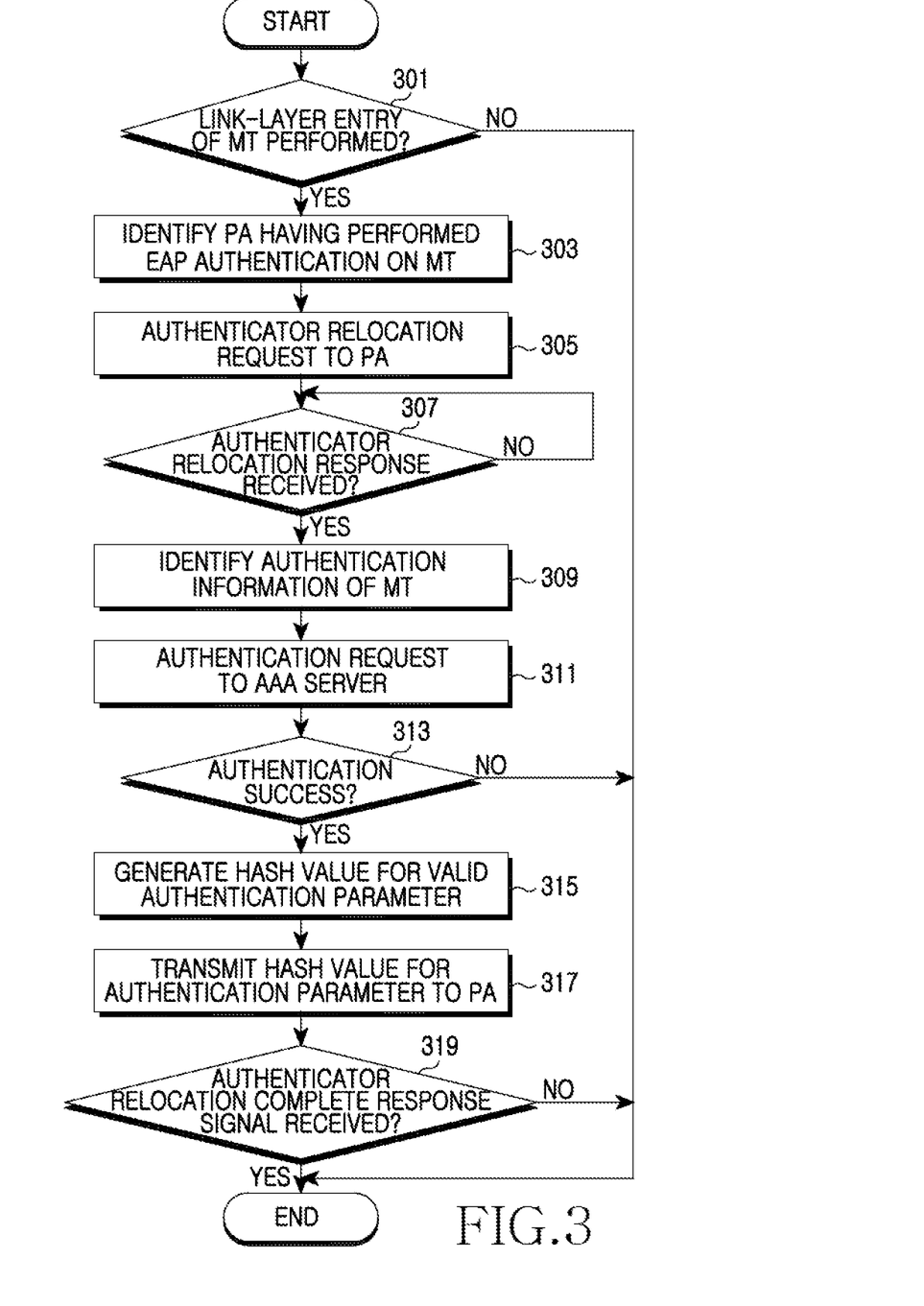
FIG. 3 is a flow diagram illustrating a procedure for authenticating an MT in an authenticator according to an exemplary embodiment of the present invention.

FIG. 3 illustrates a procedure for authenticating an MT in a New Authenticator (NA) according to an exemplary embodiment of the present invention.

Referring to FIG. 3, in step 301, the NA determines whether to perform a procedure of link-layer entry of an MT. For example, the NA determines whether a link-layer entry request signal is received from the MT that completes physical layer attachment.

If performing the procedure of link-layer entry of the MT, the NA proceeds to step 303 and identifies a Previous Authenticator (PA) of the MT. For example, the NA can identify the PA through the link-layer entry request signal received from the MT or a handover request signal. The NA may also identify the PA through a position update request signal received from the MT. The NA may also receive information on the PA of the MT from a new BS that the MT accesses.

After identifying the PA, the NA proceeds to step 305 and sends a request for authenticator relocation to the PA of the MT. For example, the NA transmits to the PA an authenticator relocation request signal that includes a Media Access Control (MAC) layer address of the MT attempting the link-layer entry and its own IDentifier (ID) information.

In step 307, the authenticator NA determines whether an authenticator relocation response signal is received from the PA. If the authenticator relocation response signal is received from the PA, the NA proceeds to step 309 and identifies authentication information on the MT in the authenticator relocation response signal. The authentication information on the MT includes a random parameter 1 (PA_Nonce) for authentication of the NA and an AAA server, a random parameter 2 (NA_Nonce) for authentication of the NA and the PA, a hash value (Previous Authenticator Verification Code (PA_VC)) for an authentication parameter of the MT, ID information of the MT, and the like. For example, the random parameter 1 can be given as 'CMAC_KEY_COUNTER'.

After identifying the authentication information on the MT, the NA proceeds to step 311 and transmits to the AAA server the hash value for the authentication parameter of the MT received from the PA. For example, the NA transmits to the AAA server an authentication request signal that includes a hash value for an authentication parameter of an MT, a random parameter 1, ID information of the MT, its own ID information, etc.

In step 313, the NA determines whether the AAA server accepts its own authentication request through an AAA response signal received from the AAA server. If the AAA server rejects the authentication request of the NA, the NA recognizes that the MT fails in authentication. Accordingly, the NA terminates the procedure according to the exemplary embodiment of the present invention. In this case, the NA can perform EAP authentication on the MT described above with reference to FIG. 1.

If the AAA server accepts the authentication request of the NA, the NA proceeds to step 315 and generates a hash value for an authentication parameter included in the AAA response signal. For example, the NA generates the hash value for the authentication parameter included in the AAA response signal using a hash function taking the random parameter 2 received from the PA in step 309 into consideration. The NA may also generate a key for generating a hash value using the authentication parameter included in the AAA response signal and then generate a hash value for the key using the hash function taking the random parameter 2 into consideration.

After generating the hash value for the authentication parameter, the NA proceeds to step 317 and transmits the generated hash value for the authentication parameter to the PA. For example, the NA transmits an authenticator relocation complete request signal including the generated hash value for the authentication parameter, to the PA.

In step 319, the NA determines whether an authenticator relocation complete response signal is received from the PA. If the authenticator relocation complete response signal is not received from the PA during a predetermined time, or an authenticator relocation complete failure signal is received, the NA recognizes that the MT fails in authenticator relocation. Accordingly, the NA terminates the procedure according to the exemplary embodiment of the present invention. In this case, the authenticator can perform the EAP authentication on the MS described above with reference to FIG. 1.

If the authenticator relocation complete response signal is received from the PA, the NA recognizes that the MT succeeds in data link entry. The procedure according to the exemplary embodiment of the present invention then concludes.

As described above, the NA can authenticate the MT using the authentication parameter of the MT received from the PA. The AAA server can operate as described below with reference to FIG. 4.

Figure 4:
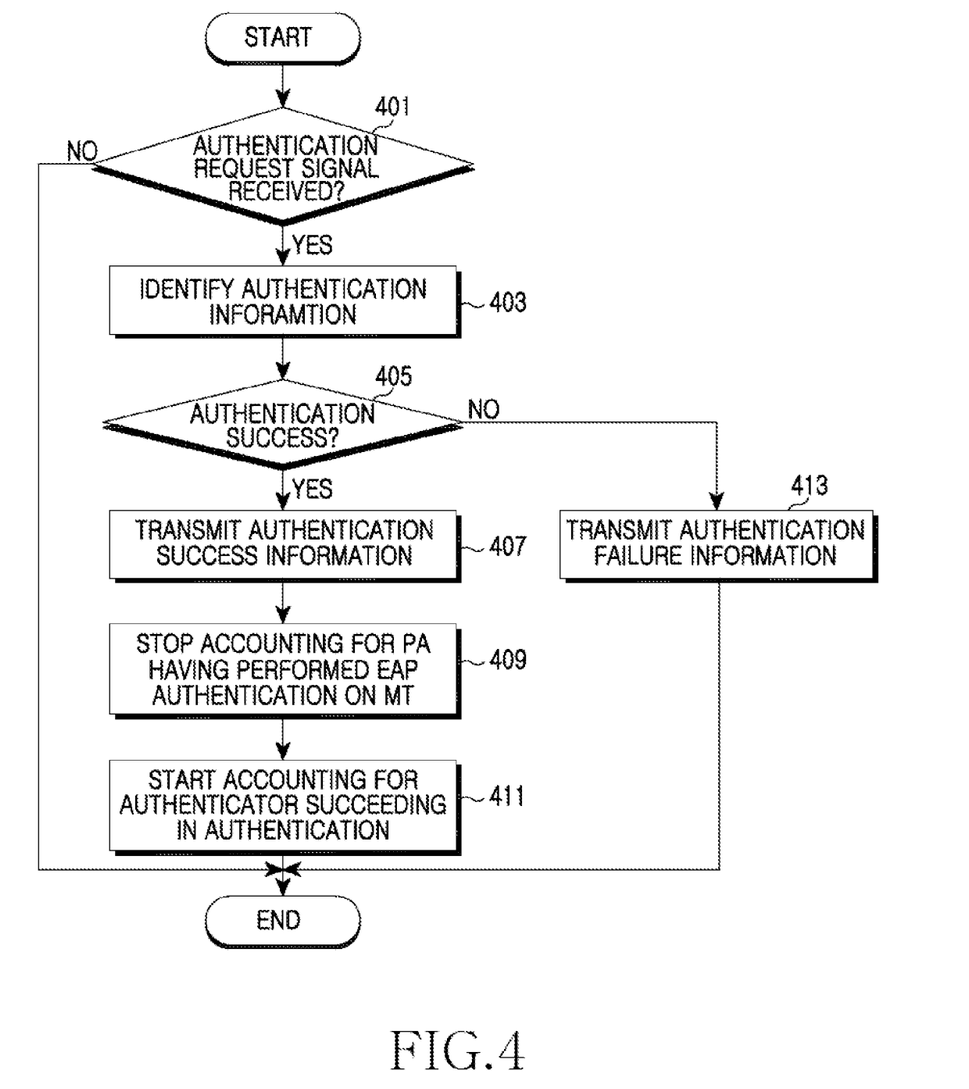
FIG. 4 is a flow diagram illustrating a procedure for relocating an authenticator of an MT in an Authentication, Authorization, and Accounting (AAA) server according to an exemplary embodiment of the present invention.

FIG. 4 illustrates a procedure for relocating an authenticator of an MT (a previous authenticator) to the NA in an AAA server according to an exemplary embodiment of the present invention.

Referring to FIG. 4, in step 401, the AAA server determines whether an authentication request signal is received from the NA. If the authentication request signal is received from the NA, the AAA server proceeds to step 403 and identifies authentication information on an MT included in the authentication request signal. The authentication information on the MT includes a hash value for an authentication parameter of the MT, a random parameter 1, ID information of the MT, ID information of the NA that transmits the authentication request signal, and the like. For example, the random parameter 1 can be given as 'CMAC_KEY_COUNTER'.

In step 405, the AAA server determines whether to accept an authentication request of the NA using the hash value for the authentication parameter of the MT. For example, the AAA server identifies the authentication parameter previously used at the time of authenticating the MT through the ID information of the MT. The AAA server generates a hash value for the authentication parameter previously used at the time of authenticating the MT, using the random parameter 1. The AAA server next compares the hash value received from the NA with the generated hash value, and determines whether to accept the authentication request of the NA.

If the hash value received from the NA is different from the generated hash value, the AAA server determines that the hash value received from the NA is invalid, and determines that the AAA server cannot accept the authentication request of the NA. Accordingly, the AAA server proceeds to step 413 and transmits authentication failure information to the NA.

If the hash value received from the NA is the same as the generated hash value, the AAA server determines that the hash value received from the NA is valid, and accepts the authentication request of the NA. Accordingly, the AAA server proceeds to step 407 and transmits authentication success information to the NA. The authentication success information includes the authentication parameter that has previously been used at the time of previously authenticating the MT, and address information of the AAA server.

After transmitting the authentication success information, the AAA server proceeds to step 409 and stops accounting for a PA of the MT. Then, when the MT and the NA complete link-layer entry, the AAA server proceeds to step 411 and starts accounting for the NA having sent the authentication request in step 401. The AAA server then terminates the procedure according to the exemplary embodiment of the present invention.

In the aforementioned exemplary implementation, the AAA server generates the hash value for the authentication parameter previously used at the time of authenticating the MT, using the random parameter 1. In another exemplary implementation, the AAA server can also generate a key for generating a hash value using an authentication parameter previously used at the time of authenticating an MT, generate a hash value for the key using a random parameter 1, compare a hash value received from the NA with the generated hash value, and determine whether to accept an authentication request of the NA.

In the aforementioned exemplary implementation, when accepting the authentication request of the NA, the AAA server transmits the authentication success information and, after that, stops the accounting for the PA. In another exemplary implementation, when accepting the authentication request of the NA, the AAA server can also perform the procedure of transmitting the authentication success information and the procedure of stopping the accounting for the PA of the MT, in parallel. In yet another exemplary implementation, when accepting the authentication request of the NA, the AAA server can also stop the accounting for the PA of the MT and, after that, transmit the authentication success information.

Figure 5:
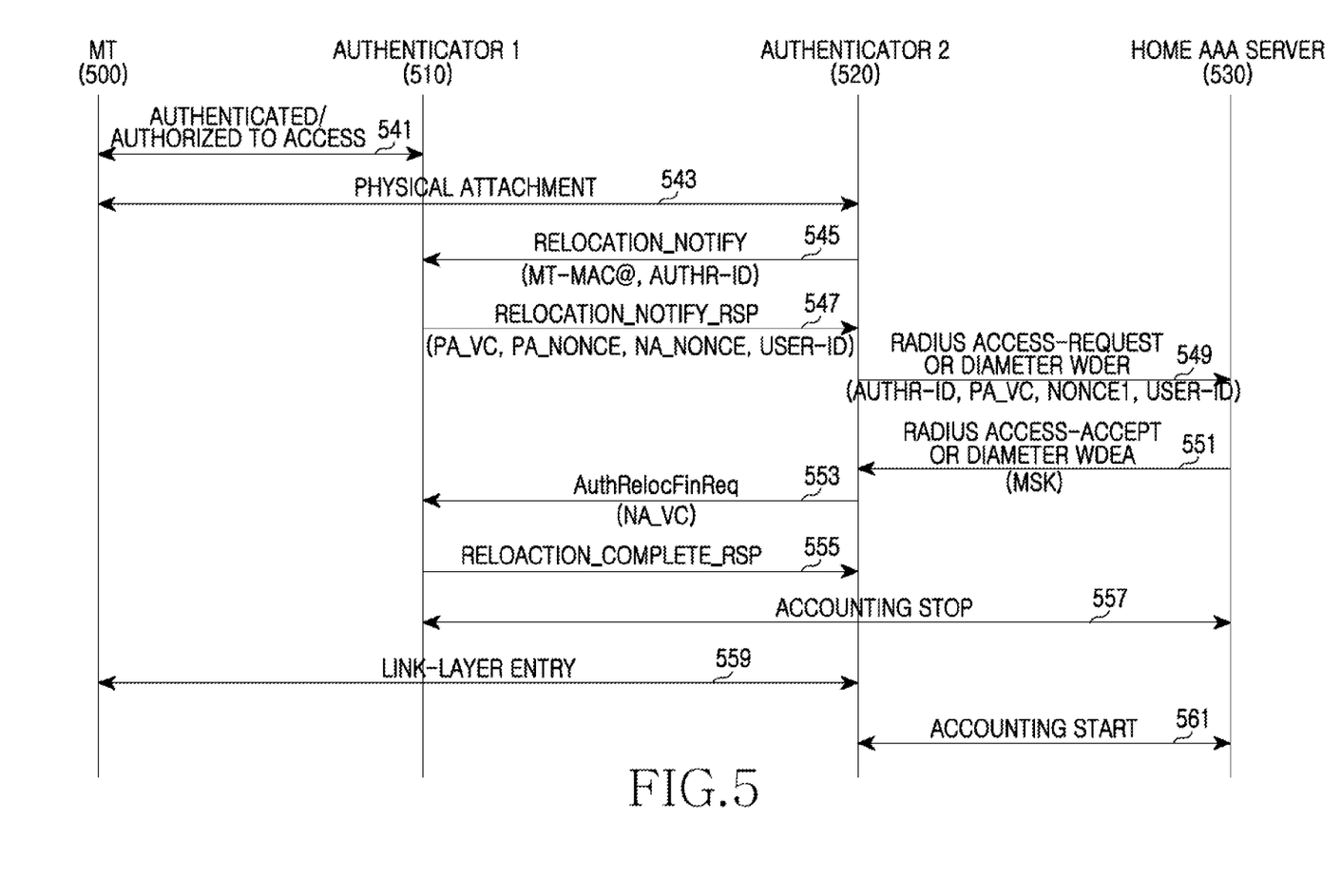
FIG. 5 is a flow diagram illustrating a procedure for relocating an authenticator of an MT in a wireless communication system according to an exemplary embodiment of the present invention.

The following description is made for a procedure for relocating an authenticator of an MT in a wireless communication system.

FIG. 5 illustrates a procedure for relocating an authenticator of an MT in a wireless communication system according to an exemplary embodiment of the present invention. Although not illustrated, BSs are positioned between an MT 500 and first and second authenticators 510 and 520, respectively. The second authenticator can be seen as corresponding to the NA discussed above.

Referring to FIG. 5, in step 541, an authentication procedure between the MT 500 and a home AAA server 530 is carried out for the MT 500 through the first authenticator 510. Here, it is assumed that the authentication procedure between the MT 500 and the AAA server 530 succeeds.

In step 543, the MT 500 authenticated from the AAA server 530 moves to a service area of a different BS and performs a physical layer attachment with the second authenticator 520. In step 545, the second authenticator 520 sends an authenticator relocation request message (Relocation_Notify) to the first authenticator 510. The authenticator relocation request message (Relocation_Notify) includes a MAC layer address (MT-MAC@) of the MT 500 and ID information (Authr-ID) of the second authenticator 520. For example, the second authenticator 520 can identify the first authenticator 510 through a link-layer entry request signal received from the MT 500 or a handover request signal. The second authenticator 520 may also identify the first authenticator 510 through a position update request signal received from the MT 500. The second authenticator 520 may also receive information on the first authenticator 510 from a new BS that the MT 500 accesses. The second authenticator 520 recognizes the first authenticator 510 as a PA.

Upon receiving the authenticator relocation request message (Relocation_Notify) from the second authenticator 520 in step 545, the first authenticator 510 generates a hash value (PA_VC) for an authentication parameter of the MT 500. For example, the first authenticator 510 generates the hash value (PA_VC) for the authentication parameter of the MT 500 using a hash function taking a random parameter 1 (PA_Nonce) into consideration. The first authenticator 510 may also generate a key for generating a hash value using the authentication parameter of the MT 500 and then generate a hash value (PA_VC) for the key using the hash function taking the random parameter 1 (PA_Nonce) into consideration. The authentication parameter of the MT 500 represents an authentication parameter that has previously been used at a time when the first authenticator 510 authenticates the MT 500. The random parameter 1 (PA_Nonce) can be given as 'CMAC_KEY_COUNTER'.

After generating the hash value (PA_VC), the first authenticator 510 sends the second authenticator 520 an authenticator relocation response message (Relocation_Notify_Rsp). The authenticator relocation message includes the generated hash value (PA_VC). For example, the authenticator relocation response message (Relocation_Notify_Rsp) includes authentication information on the MT 500, such as the random parameter 1 (PA_Nonce) for authentication of the second authenticator 520 and the AAA server 530, a random parameter 2 (NA_Nonce) for authentication of the first authenticator 510 and the second authenticator 520, the hash value (PA_VC) for the authentication parameter of the MT 500, ID information (USER-ID) of the MT 500, and the like.

The second authenticator 520 identifies the authentication information on the MT 500 in the authenticator relocation response message (Relocation_Notify_Rsp). The authentication information on the MT 500 may include the random parameter 1 (PA_Nonce) included in the authenticator relocation response message (Relocation_Notify_Rsp), the random parameter 2 (NA_Nonce), the hash value (PA_VC) for the authentication parameter of the MT 500, the ID information (USER-ID) of the MT 500, and the like.

In step 549, the second authenticator 520 sends the AAA server 530 an AAA request message (RADIUS Access-Request or Diameter WDER) including the hash value (PA_VC) for the authentication parameter of the MT 500. The AAA request message includes the hash value (PA_VC) for the authentication parameter of the MT 500, the random parameter 1 (PA_Nonce), the ID information (USER-ID) of the MT 500, and ID information (Authr-ID) of the second authenticator 520.

The AAA server 530 determines if the hash value (PA_VC) for the authentication parameter of the MT 500 received from the second authenticator 520 is valid. For example, the AAA server 530 identifies the authentication parameter previously used at the time of authenticating the MT 500, through the ID information (USER-ID) of the MT 500 included in the AAA request message (RADIUS Access-Request or Diameter WDER). The AAA server 530 generates a hash value for the authentication parameter previously used at the time of authenticating the MT 500, using the random parameter 1 (PA_Nonce) included in the AAA request message (RADIUS Access-Request or Diameter WDER). The AAA server 530 then compares the hash value (PA_VC) received from the second authenticator 520 with the generated hash value to determine whether the hash value (PA_VC) received from the second authenticator 520 is valid.

If the hash value (PA_VC) received from the second authenticator 520 is the same as the generated hash value, the AAA server 530 determines that the hash value (PA_VC) received from the second authenticator 520 is valid. The AAA server 530 then accepts an authentication request of the second authenticator 520.

Accordingly, in step 551, the AAA server 530 sends the second authenticator 520 an AAA response message (RADIUS Access-Accept or Diameter WDEA) including the authentication parameter (e.g., the MSK) of the MT 500. The AAA response message includes the authentication parameter (e.g., the MSK) of the MT 500 and address information of the AAA server 530.

If the hash value (PA_VC) received from the second authenticator 520 is different from the generated hash value, the AAA server 530 determines that the hash value (PA_VC) received from the second authenticator 520 is invalid. In this case, the AAA server 530 determines that the AAA server 530 cannot accept the authentication request of the second authenticator 520. Accordingly, in step 551, the AAA server 530 sends the second authenticator 520 an AAA response message (RADIUS Access-Accept or Diameter WDEA) including authentication failure information.

In this fashion, the second authenticator 520 determines whether the AAA server 530 accepts authentication through the AAA response message received from the AAA server 530.

When the AAA server 530 accepts the authentication, the second authenticator 520 generates a hash value (NA_VC) for the authentication parameter of the MT 500 included in the AAA response message (RADIUS Access-Accept or Diameter WDEA). For example, the second authenticator 520 generates the hash value (NA_VC) for the authentication parameter received from the AAA server 530 using a hash function taking a random parameter 2 received from the first authenticator 510 into consideration. The second authenticator 520 may also generate a key for generating a hash value using the authentication parameter of the MT 500 included in the AAA response message (RADIUS Access-Accept or Diameter WDEA) and then, generate a hash value (NA_VC) for the key using the hash function taking the random parameter 2 received from the first authenticator 510 into consideration.

In step 553, the second authenticator 520 sends the first authenticator 510 an authenticator relocation complete request message (Relocation_Complete_Req) including the hash value (NA_VC) for the authentication parameter of the MT 500.

The first authenticator 510 determines if the hash value (NA_VC) for the authentication parameter of the MT 500 received from the second authenticator 520 is valid. For example, the first authenticator 510 generates a hash value for its own authentication parameter of the MT 500 using a hash function taking the random parameter 2 transmitted to the second authenticator 520 into consideration. After that, the first authenticator 510 compares the hash value (NA_VC) received from the second authenticator 520 with the generated hash value, thus determining a validity of the hash value (NA_VC) for the authentication parameter of the MT 500 received from the second authenticator 520.

If the hash value (NA_VC) received from the second authenticator 520 is the same as the generated hash value, the first authenticator 510 determines that the hash value (NA_VC) for the authentication parameter of the MT 500 received from the second authenticator 520 is valid. Accordingly, in step 555, the first authenticator 510 sends an authenticator relocation complete response message (Relocation_Complete_Rsp) to the second authenticator 520.

When determining that the hash value (NA_VC) for the authentication parameter of the MT 500 received from the second authenticator 520 is valid, the first authenticator 510 recognizes that the second authenticator 520 is authenticated from the AAA server 530. Accordingly, in step 557, the first authenticator 510 and the AAA server 530 stop an accounting processor.

When the authenticator relocation complete response message (Relocation_Complete_Rsp) is received from the first authenticator 510, in step 559, the second authenticator 520 recognizes that the MT 500 succeeds in data link entry. Accordingly, in step 561, the second authenticator 520 and the AAA server 530 start an accounting processor.

In the aforementioned exemplary embodiment, it is assumed that the PA uses the authentication parameter of the MT. However, when the PA does not use the authentication parameter of the MT, the PA can also transmit an authenticator relocation failure signal to an authenticator having sent an authenticator relocation request.

As described above, exemplary embodiments of the present invention have an advantage of being capable of reducing a time delay caused by EAP authentication, by authenticating an MT using an authentication parameter that a different authenticator has ever used for authenticating the MT in an authenticator of a communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for authenticating a Mobile Station (MS) in a communication system, the method comprising:
sending a first message from a first authenticator to a second authenticator, wherein the first message includes ID information of the first authenticator;
sending a second message from the second authenticator to the first authenticator in response to the first message, wherein the second message includes a first hash value, a first random parameter, and a second random parameter, the first hash value generated based on a hash function using the first random parameter;
sending a third message from the first authenticator to an Authentication, Authorization, and Accounting (AAA) server other than the second authenticator, wherein the third message includes the first hash value, the first random parameter, the ID information of the first authenticator;
in the AAA server, determining a validity of the first hash value;
when the AAA server determines that the first hash value is valid, sending a fourth message from the AAA server to the first authenticator in response to the third message, the fourth message including an authentication parameter of the MS;
sending a fifth message from the first authenticator to the second authenticator, wherein the fifth message includes a second hash value and the second hash value is generated based on a hash function using the second random parameter;
in the second authenticator, determining a validity of the second hash value; and
sending a sixth message from the second authenticator to the first authenticator in response to the fifth message.

2. The method of claim 1, wherein the second authenticator comprises an authenticator through which, when the MS has been authenticated from the AAA server before accessing a physical layer of the first authenticator, the MS and the AAA server communicate for authentication.

3. The method of claim 1, wherein the first random parameter comprises a 'CMAC_KEY_COUNTER'.

4. The method of claim 1, wherein the determining of the validity of the first hash value comprises:
identifying, in the AAA server, authentication information previously used at the time of authenticating the MS;
generating, in the AAA server, a third hash value based on a hash function using the first random parameter received from the first authenticator and the identified authentication information; and
comparing, in the AAA server, the first hash value with the third hash value and determining the validity of the first hash value based on the result of the comparison.

5. The method of claim 1, wherein the determining of the validity of the second hash value comprises:
in the second authenticator, generating a fourth hash value based on a hash function using the second random parameter; and
in the second authenticator, comparing the second hash value with the fourth hash value, and determining the validity of the second hash value based on the result of the comparison.

6. The method of claim 1, wherein the first message further includes ID information of the MS.

7. The method of claim 1, wherein, before sending the first message, the MS is successfully authenticated from the second authenticator and the MS performs a physical layer attachment with the first authenticator.

8. The method of claim 1, wherein the first authenticator caches the received second random parameter.

9. A communication system for authenticating a Mobile Station (MS), the system comprising:
a first authenticator including a first transmitter;
a second authenticator including a second transmitter; and
a Authentication, Authorization, and Accounting (AAA) server other than the second authenticator and including a third transmitter,
wherein the first transmitter of the first authenticator is configured to transmit a first message to the second authenticator, wherein the first message includes ID information of the first authenticator,
wherein the second transmitter of the second authenticator is configured to transmit a second message from the second authenticator to the first authenticator in response to the first message, wherein the second message includes a first hash value, a first random parameter, a second random parameter, the first hash value generated based on a hash function using the first random parameter,
wherein the first transmitter of the first authenticator is configured to transmit a third message to an AAA server, wherein the third message includes the first hash value, the first random parameter, and the ID information of the first authenticator,
wherein the AAA server is configured to determine a validity of the first hash value, and the third transmitter of the AAA server is configured to transmit a fourth message to the first authenticator when the first hash value is determined to be valid;
wherein the fourth message includes an authentication parameter of the MS, wherein the first transmitter of the first authenticator is configured to transmit a fifth message to the second authenticator, wherein the fifth message includes a second hash value, the second hash value generated based on a hash function using the second random parameter, and
wherein the second authenticator is configured to determine a validity of the second hash value, and the second transmitter of the second authenticator is configured to transmit a sixth message to the first authenticator in response to the fifth message.

10. The system of claim 9, wherein the second authenticator comprises an authenticator through which, when the MS has been authenticated from the AAA server before accessing a physical layer of the first authenticator, the MS and the AAA server communicate for authentication.

11. The system of claim 9, wherein the first random parameter comprises 'CMAC_KEY_COUNTER'.

12. The system of claim 9, wherein the AAA server, when determining the first hash value to be valid, is configured to generate a third hash value for authentication information previously used at the time of authenticating the MS based on a hash function using the first random parameter received from the first authenticator, compare the first hash value with the third hash value, and determine the validity of the first hash value based on the result of the comparison.

13. The system of claim 9, wherein the second authenticator is configured to generate a fourth hash value based on a hash function using the second random parameter, compare the second hash value with the fourth hash value, and determine a validity of the second hash value based on a result of the comparison.

14. The system of claim 9, wherein the first message further includes ID information of the MS.

15. The system of claim 9, wherein, before sending the first message, the MS is successfully authenticated from the second authenticator and the MS performs a physical layer attachment with the first authenticator.

16. The system of claim 9, wherein the first authenticator caches the received second random parameter.

17. A method for authenticating a Mobile Station (MS) in an authenticator, the method comprising:
sending a first message to a second authenticator, wherein the first message includes ID information of a first authenticator;
when a second message is received from the second authenticator, identifying a first hash value, a first random parameter, and a second random parameter in the second message, wherein the first hash value is generated based on a hash function using the first random parameter;

sending a third message to an Authentication, Authorization, and Accounting (AAA) server other than the second authenticator, wherein the third message includes the first hash value, the first random parameter, the ID information of the first authenticator;

when a fourth message is received from the AAA server, identifying an authentication parameter of the MS in the fourth message;

sending a fifth message to the second authenticator, wherein the fifth message includes a second hash value, the second hash value generated based on a hash function using the second random parameter; and receiving a sixth message from the second authenticator in response to the fifth message, wherein the fourth message is received from the AAA server, if it is determined that the first hash value included in the third message is valid, and wherein the sixth message is received from the second authenticator, if it is determined that the second hash value included in the fourth message is valid.

18. The method of claim 17, further comprising:
before sending the first message, identifying the second authenticator.

19. The method of claim 17, wherein the first random parameter comprises 'CMAC_KEY_COUNTER'.

20. The method of claim 17, further comprising:
after sending fifth message, recognizing that the MS succeeds in data link entry when a sixth message is received from the second authenticator.

21. The method of claim 17, wherein the first message further includes ID information of the MS.

22. The method of claim 17, wherein, before sending the first message, the MS is successfully authenticated from the second authenticator and the MS performs a physical layer attachment with the first authenticator.

23. The method of claim 17, wherein the first authenticator caches the received second random parameter.

* * * * *